United States Patent
Ghosh et al.

(10) Patent No.: US 10,467,642 B2
(45) Date of Patent: Nov. 5, 2019

(54) VIRTUAL REDEEMABLE OFFERS

(75) Inventors: Riddhiman Ghosh, Sunnyvale, CA (US); Jhilmil Jain, Mountain View, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 2860 days.

(21) Appl. No.: 12/287,921

(22) Filed: Oct. 15, 2008

(65) Prior Publication Data

US 2010/0094701 A1 Apr. 15, 2010

(51) Int. Cl.
*G06Q 30/00* (2012.01)
*G06Q 30/02* (2012.01)

(52) U.S. Cl.
CPC ........ *G06Q 30/0207* (2013.01); *G06Q 30/00* (2013.01); *G06Q 30/0236* (2013.01); *G06Q 30/0238* (2013.01)

(58) Field of Classification Search
CPC ................... G06Q 30/0207; G06Q 30/0238
USPC .................... 705/14.37, 14.38, 14
See application file for complete search history.

(56) References Cited

U.S. PATENT DOCUMENTS

| | | | | |
|---|---|---|---|---|
| 5,907,350 A | * | 5/1999 | Nemirofsky | .................... 725/23 |
| 5,918,211 A | * | 6/1999 | Sloane | ............................ 705/16 |
| 5,923,735 A | * | 7/1999 | Swartz | ..................... G07F 7/00 |
| | | | | 235/472.01 |
| 5,956,694 A | * | 9/1999 | Powell | ....................... 705/14.38 |
| 6,237,145 B1 | * | 5/2001 | Narasimhan et al. | .......... 725/23 |
| 6,332,128 B1 | * | 12/2001 | Nicholson | .................. 705/14.26 |
| 6,587,835 B1 | * | 7/2003 | Treyz | ..................... G06Q 20/12 |
| | | | | 705/14.64 |
| 6,595,342 B1 | * | 7/2003 | Maritzen et al. | ............. 194/212 |
| 7,555,444 B1 | * | 6/2009 | Wilson | ................... G06Q 30/02 |
| | | | | 705/14.41 |
| 8,833,652 B2 | * | 9/2014 | Rasband | ........... G06F 17/30879 |
| | | | | 235/375 |
| 2002/0117544 A1 | * | 8/2002 | Wolf | .................. G06K 17/0022 |
| | | | | 235/383 |
| 2002/0130184 A1 | * | 9/2002 | Sanders | ............. G06K 7/10851 |
| | | | | 235/472.03 |
| 2002/0187750 A1 | * | 12/2002 | Majumdar | ...................... 455/41 |
| 2003/0028426 A1 | * | 2/2003 | Banerjee | ................ G06Q 30/02 |
| | | | | 705/14.37 |
| 2003/0115152 A1 | * | 6/2003 | Flaherty | .......................... 705/65 |
| 2003/0145222 A1 | * | 7/2003 | Gittler et al. | ................. 713/200 |
| 2003/0195800 A1 | * | 10/2003 | Peters | .................. G06Q 20/201 |
| | | | | 705/14.25 |

(Continued)

FOREIGN PATENT DOCUMENTS

WO WO 2008040004 A2 * 4/2008 ....... G06F 17/30867

*Primary Examiner* — Matthew L Hamilton (57) ABSTRACT

Systems, methods, and other embodiments associated with tracking in store consumer behavior are described. One example method includes receiving a product tag data (PTD) and a personal data (PD) from a portable digital device (PDD). The PTD is associated with a scan of a product tag of a product. The example method may also include storing the PTD and the PD in a database. The example method may also include creating a virtual redeemable offer (VRO) based, at least in part, on an analysis of the PD, the PTD associated with the scan, and a product information (PI) associated with the product tag. The PI may be stored in the database and describes the product. The example method may also include providing the CRVC to the PDD.

15 Claims, 6 Drawing Sheets

(56) References Cited

U.S. PATENT DOCUMENTS

| | | | |
|---|---|---|---|
| 2003/0233276 A1* | 12/2003 | Pearlman et al. | 705/14 |
| 2004/0139025 A1* | 7/2004 | Coleman | 705/51 |
| 2005/0246196 A1* | 11/2005 | Frantz | G06Q 30/0203 705/7.32 |
| 2005/0281237 A1* | 12/2005 | Heinonen et al. | 370/338 |
| 2006/0011728 A1* | 1/2006 | Frantz | G06Q 30/02 235/462.46 |
| 2006/0036502 A1* | 2/2006 | Farrell | G06F 17/30879 705/23 |
| 2006/0200480 A1* | 9/2006 | Harris | G06F 17/30876 |
| 2007/0063050 A1* | 3/2007 | Attia | G06F 17/30879 235/462.46 |
| 2007/0118388 A1* | 5/2007 | Hamilton | G06Q 30/06 705/1.1 |
| 2007/0179843 A1* | 8/2007 | Eichenbaum | G06Q 30/02 705/14.23 |
| 2007/0293202 A1* | 12/2007 | Moshir | G06F 21/552 455/414.2 |
| 2008/0052169 A1* | 2/2008 | O'Shea | G06Q 20/10 705/14.17 |
| 2008/0195456 A1* | 8/2008 | Fitzpatrick | G06F 17/30867 705/7.15 |
| 2010/0088148 A1* | 4/2010 | Presswala | G06Q 30/02 705/7.29 |
| 2011/0066504 A1* | 3/2011 | Chatow | G06Q 30/02 705/14.65 |
| 2013/0048721 A1* | 2/2013 | Rasband | G06F 17/30879 235/383 |
| 2014/0143029 A1* | 5/2014 | Kail | G06Q 30/0623 705/14.1 |

\* cited by examiner

VIRTUAL REDEEMABLE OFFERS

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Traditional paper coupons have been in use for decades to encourage consumers to purchase products. However, paper coupons lead to negative customer experiences. The effort spent to find and clip the coupons may be wasted when the coupons are forgotten. Also, the negative environmental affect of printing additional newspaper pages for coupons that are not used and thrown away is recognized by an environmentally conscious population. Although paper coupons have negative characteristics, they do allow manufactures and retailers to encourage purchasing of products. Additionally, coupon usage may be tracked by databases to determine customer buying trends and patterns. For example, conventional point of sale (POS) systems may collect coupon data along with all of the other purchases made by a particular consumer. This may allow a retailer to determine that customers who purchased one product are likely to purchase a second product if an incentive (e.g. coupon) is given, for example, with the first product for a discount on the second product. However, these examples only relate to products that the customer purchased and coupons that were redeemed.

In contrast, online retailers may track additional customer preferences by tracking products that a customer has viewed but did not purchase. This is accomplished by storing and analyzing information regarding the products selected for viewing by the customer. For example, the viewed web pages associated with products may be tracked. This additional data may help retailers more accurately predict the desires of a customer than purchasing information alone. In some cases, information regarding what was already purchased may no longer be useful to a retailer because the desire may be satisfied forever by the purchased product. However, information on what was viewed but not purchased may lead to more effective marketing because it targets desires that may not yet be satisfied.

Unlike online stores, retailers with physical locations have traditionally not been able to track offers and products that customers viewed but did not purchase. Some unusual systems have attempted to track customer product viewing in physical store locations but they have met with limited success. For example, infrared tracking systems have been utilized to track the movements of customers through a store. However, these systems have the drawback of not always being able to pinpoint the product being viewed by the customer. Instead they may only provide the general location of a customer in a store. Additionally, infrared tracking systems are considered by some customers to be an invasion of privacy and their use is regarded as Orwellian.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Customer preferences are tracked in a variety of ways. In stores with physical locations the buying habits of a customer may be tracked at a POS system during the customer checkout. In addition to those tracking systems, newer technologies may allow the product viewing habits of a customer to be tracked in a store with a physical location much like customer product viewing may be tracked during online shopping. Mobile devices, like cellular phones, increasingly include technology that enables them to scan product tags in a store. These scanners may include radio frequency identification (RFID) product tag scanners, near field communication (NFC) product tag scanners, and so on.

Once a customer scans a product tag with a mobile device, the information may be sent to a database that includes information about the product that would be of interest to the customer. Information regarding the product may then be sent back to the mobile device. This information may include a virtual redeemable offer (VRO) that is much like a paper coupon, except that it may be storable and displayable on the mobile device. In some embodiments, the VRO may be converted into a displayable barcode on a display screen of the mobile device for reading by a barcode scanner on a point of sale (POS) system for store checkout. In addition to the product tag scan, personal information about the buyer may also be sent to the database to allow a customer profile to be determined. By tracking the purchases, products viewed (e.g. scanned), and the VROs that are used by a customer, the desires of the customer may be more accurately predicted. By using information regarding customer product viewing habits, the database may increase accuracy of targeted marketing (e.g. VROs) over traditional methods that utilize customer purchasing habits alone.

For example, a customer using a mobile device equipped with a product tag scanner may scan the same product on multiple occasions but not purchase the product. After a number of scans the database may determine that the customer should be given a VRO for the scanned product to increase the likelihood that the customer will purchase the product. VROs have an additional advantage over newspaper coupons because they can be given at the point where the customer is viewing the product. The VRO may also be given for a store brand product that is similar to the product being viewed. Customers have an incentive to use their mobile devices for product scans because they may receive VROs with discounts or additional product information not listed on the product.

In another embodiment, the mobile device may download an applet that includes a product database with relevant product information to the mobile device. This applet may perform the work of a remote database in a traditional client-server environment and be able to generate its own VROs and track customer preferences. At periodic intervals, the applet may send data associated with product tag scans and personal information back to a centralized database.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
PCI: peripheral component interconnect.
PCIE: PCI express.
RAM: random access memory.
DRAM: dynamic RAM.
SRAM: static RAM.
ROM: read only memory.
SQL: structured query language.
OQL: object query language.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a cellular carrier network, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a relation in a relational database, or similar entity in some other data storage and management system. In other examples, "database" may be used to refer to a set of relations. In still other examples, "database" may refer to a set of data stores and methods for accessing and/or manipulating those data stores.

"Data store", as used herein, refers to a physical and/or logical entity that can store data. A data store may be, for example, a database, a relation, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 1:
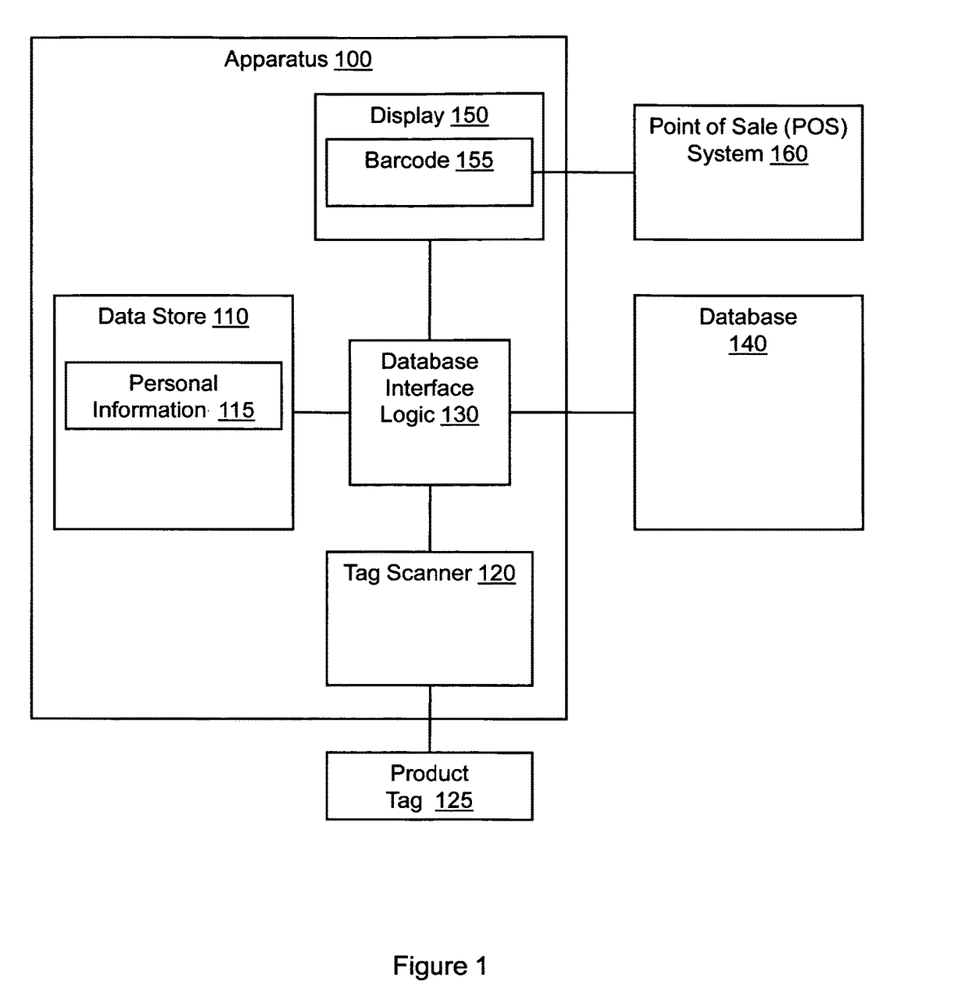
FIG. 1 illustrates one embodiment of an apparatus associated with virtual redeemable offers.

FIG. 1 illustrates an apparatus 100 associated with in store consumer behavior. In different embodiments, the apparatus 100 may be a cellular telephone, a personal digital assistant (PDA), a portable computer, a transferable card that may be connected and disconnected to digital devices, and so on.

Apparatus 100 includes a data store 110 to store a personal information 115 of a user of the apparatus 100. The personal information 115 may include a customer identification number, a customer name, an apparatus identification number, a data store to store data scanned from a product or product identifier, and so on.

Apparatus 100 may also include a tag scanner 120 to read a product tag 125 to acquire a product tag information. The tag scanner 120 may be operable to read a radio frequency identification (RFID) product tag, a near field communication (NFC) product tag, and so on. RFID sensing does not require the apparatus 100 to be pointed directly at the product tag 125 as required by an infrared scanner. Instead, an RFID sensor may read the product tag 125 by being placed in the vicinity of the product tag 125, emitting a signal, and reading the return of the signal from the product tag 125. In another example, the data store to store data scanned from a product or product identifier, may include information associated with a past scan(s) of product tags. This may allow the apparatus 100 to store multiple product tag scans. A database interfacing with the apparatus 100 may be able to utilize the multiple scans and the personal information 115 to build a profile of the buying preferences of a customer.

Apparatus 100 may also include a database interface logic 130 to send the personal information 115 and the product tag information to a database 140. The database interface logic 130 may also receive a product information from the database 140. The product information may be based at least in part, on the product tag information. The product information may also include a detailed product description, a customized marketing data, a virtual redeemable offer (VRO), and so on. The customized marketing data may be, for example, a customized product data that is created based on a personal profile of the user. The VRO may be a coupon that is also created based on the personal profile of the user. The personal profile of the user may include past scans by the tag scanner 120 that are stored in a memory and the personal information 115. Analysis of these past scans may indicate the buying trends and desires of the user.

In another embodiment, a privacy logic may also be included to control the database interface logic 130 to selectively share the personal information 115 with the database 140. This allows a user of the apparatus 100 to turn off the transmission of personal information to the database 140 for enhanced privacy. In another embodiment, the VRO is provided to a second apparatus by the apparatus 100 to facilitate redemption of the VRO using the second apparatus. For example, this may allow for the transfer of VROs between different individuals. A father may receive a VRO at a store, take it home to mom for purchasing approval, and transfer the VRO to the digital device belonging to his wife so that she can purchase the product and redeem the VRO. In another embodiment, the product tag 125 may be located at a first store and the VRO provided as a result of the product scan may be redeemable at a second store. For example, a purchaser may receive a VRO for a gas grill that the customer is viewing at a store while on vacation in North Carolina. However, the VRO may be used by the customer at a store in his or her home state of Ohio.

Apparatus 100 may also include a display 150 to display a barcode 155 that is scannable by a barcode scanner associated with a point of sale (POS) system 160. The barcode 155 may be associated with the VRO. For example, the barcode may identify a product and a discount code for which the VRO provides a discount.

Figure 2:
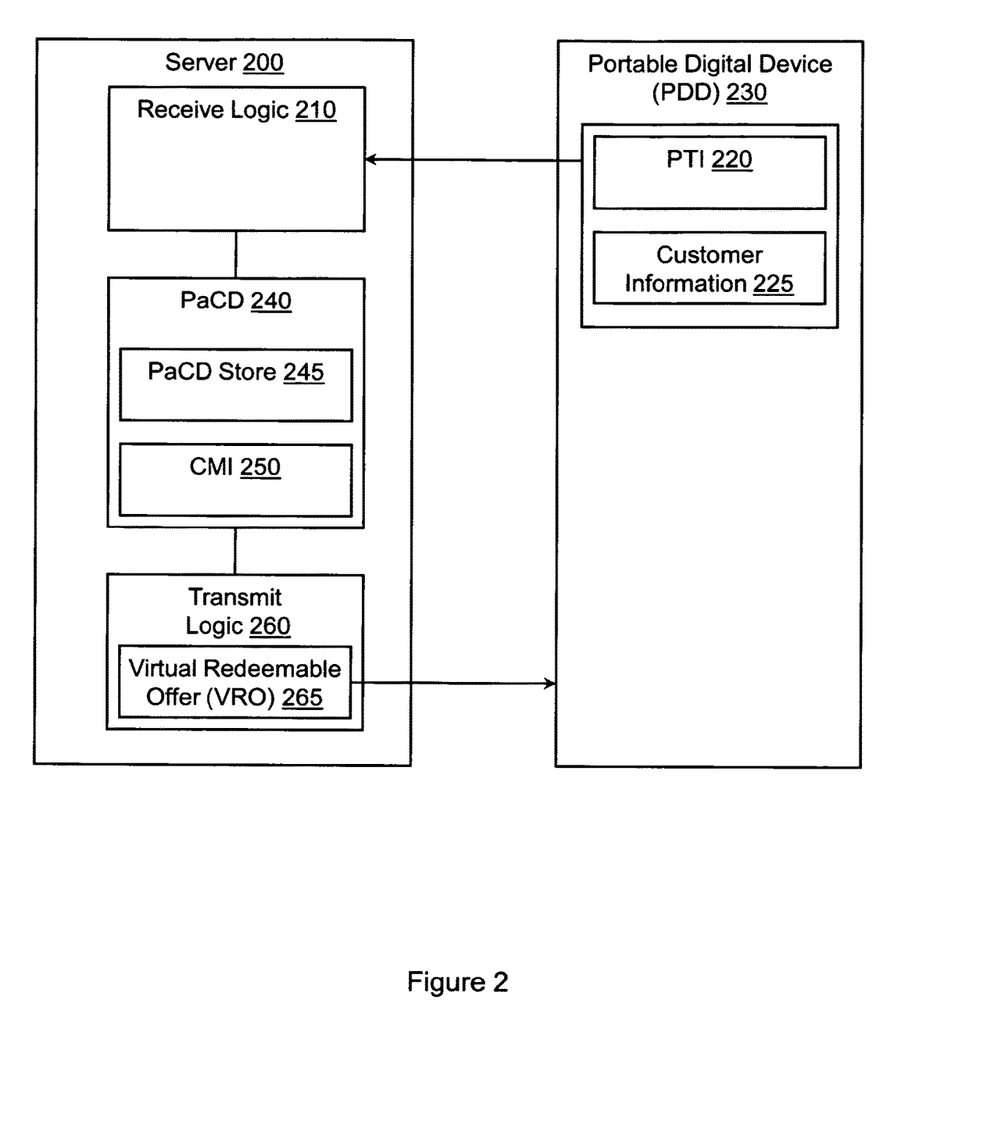
FIG. 2 illustrates one embodiment of a server associated with virtual redeemable offers.

FIG. 2 illustrates a server 200 associated with in store consumer behavior. The server 200, may interact with the apparatus 100 of FIG. 1 to provide it with the product information. In one embodiment, the server 200 may include the database 140 of FIG. 1. In another embodiment, the server 200 may be located in a store where a customer is shopping or it may be located in a centralized location where it serves multiple stores.

Server 200 includes a receive logic 210 to receive a product tag information (PTI) 220 and a customer information 225 from a portable digital device (PDD) 230. The PTI 220 may be associated with a scan of a product tag by the PDD 230. In one example, the scan of the product tag by the PDD 230 may be performed, for example, with the tag scanner 120 of FIG. 1.

Server 200 also includes a product and customer database (PaCD) 240 to store the PTI 220 and the customer information 225 in a PaCD store 245. The PaCD 240 may also create a customized marketing information (CMI) 250 based, at least in part, on the PTI 220 and the customer information 225. The CMI 250 may include a product information associated with the PTI 220 and retrieved from the PaCD store 245. In one embodiment, the CMI 250 is also based, at least in part, on the scan of a product by the PDD 230 and information from a previous scan of a product by the PDD 230 that is stored in the PaCD store 245.

Server 200 also includes a transmit logic 260 to transmit the CMI 250 to the PDD 230. The CMI 250 that is transmitted to the PDD 230 may include a virtual redeemable offer (VRO) 265 that is storeable on the PDD 230. The VRO 265 may be redeemable at a point of sale (POS) system.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
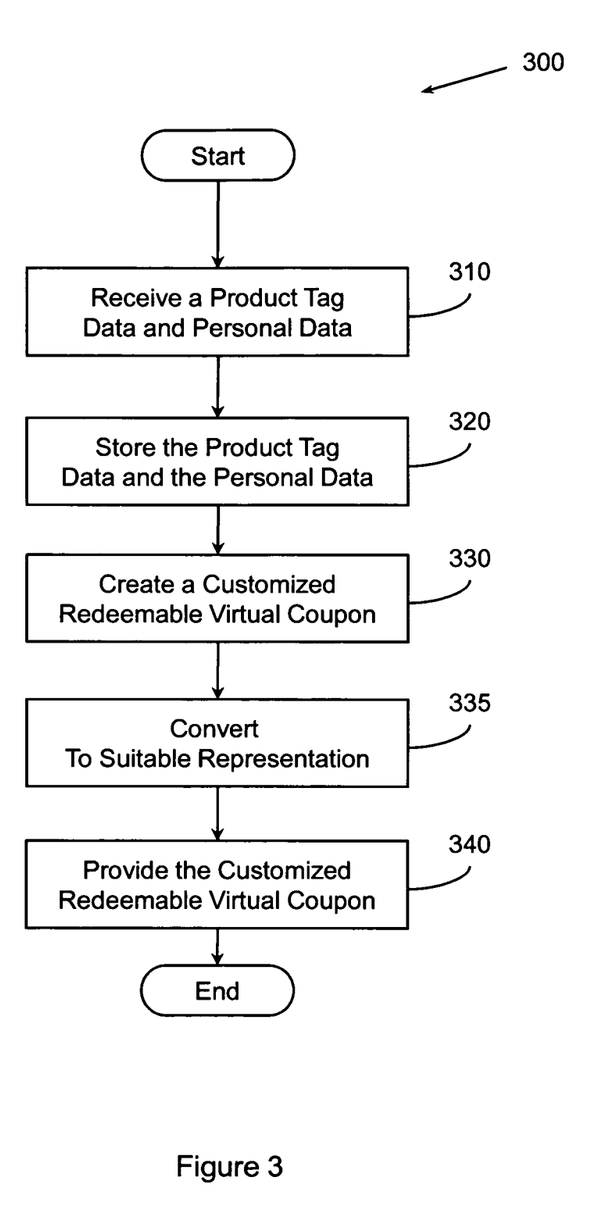
FIG. 3 illustrates one embodiment of a method associated with virtual redeemable offers.

FIG. 3 illustrates a method 300 associated with in store consumer behavior. Method 300 may include, at 310, receiving a product tag data (PTD) and a personal data (PD). The PTD and the PD may be received from a portable digital device (PDD). The PTD may be associated with a scan of a product tag of a product.

In another embodiment, receiving a PTD and a PD from the PDD includes receiving a product tag from a mobile phone that performs the scan by using a radio frequency identification (RFID) scanner. In another embodiment, receiving the PTD and the PD at 310 from the PDD is performed via a radio frequency link utilizing transmission control protocol internet protocol (TCP/IP). While TCP/IP is mentioned, one skilled in the art will appreciate that other protocols may be employed.

Method 300 may also include, at 320, storing the PTD and the PD. The PTD and the PD may be stored in a database. Method 300 may also include, at 330, creating a customized redeemable virtual coupon (CRVC). The CRVC may be based, at least in part, on an analysis of the PD, the PTD associated with the scan, and a product information (PI) associated with the product tag. The PI may be stored in the database and describes the product. In another embodiment, creating the CRVC at 330 also includes analyzing a PTD associated with a past scan of a previous product tag. The PTD associated with the past scan may be stored in the database.

In another embodiment, creating a CRVC at 330 may also be based, at least in part, on PTDs associated with past scans. The collecting of the PTDs associated with multiple scans allows the database to build an overall customer profile on the products being viewed by the customer not just what is being purchased. This may allow the database to more effectively predict the desires of customers and deliver CRVCs that are targeted to those desires. Targeting a desire with the CRVC saves customers time and frustration by giving them offers for what they want without having to search, for example, a newspaper for coupons.

Method 300 may also include, at 335, converting a portion of the CRVC to a representation that is suitable for presentation to a point of sale (POS) device. The suitable representation may be, for example, a barcode or other scannable representation. In one example the suitable representation may be created on the PDD, in which case action 335 would come after action 340. In another example, the suitable representation may be made and provided along with the CRVC to the PDD.

Method 300 may also include, at 340, providing the CRVC. The CRVC may be provided to the PDD. In another embodiment, the CRVC may include information from which a redeemable coupon to display on a display of the PDD is produced. In another embodiment, the redeemable coupon displayed on the display may be scannable by a barcode scanner on a point of sale (POS) system. In another embodiment, the redeemable coupon associated with the CRVC may be redeemable by a POS system located at a different store than the store in which the product that was scanned by the PDD is located.

In another embodiment, method 300 may also include receiving from the POS system information associated with the CRVC that was scanned and redeemed at the POS system. The database may store the information associated with the CRVC in the database. This action may be performed after providing the CRVC at 340 to the PDD to allow the database to acquire information on which CRVCs were redeemed. This information may also allow retailers to track customer purchasing habits by tracking the effectiveness of CRVCs.

In another embodiment, method 300 may include determining a customer preference based on analyzing the PD, the PTD associated with the scan, the PI, and/or the PTD associated with a past scan(s).

While FIG. 3 illustrates various actions occurring in serial, it is to be appreciated that various actions illustrated in FIG. 3 could occur substantially in parallel. By way of illustration, a first process could receive a product tag at 310, a second process could store the product tag data and the personal data at 320, a third process could create a CRVC at 330, and fourth process could provide the CRVC at 340. While four processes are described, it is to be appreciated that a greater and/or lesser number of processes could be employed and that lightweight processes, regular processes, threads, and other approaches could be employed. In another embodiment, any one or more of the four processes may also be implemented as or within a computer component or as or within an ASIC.

In one example, a method may be implemented as computer executable instructions. Thus, in one example, a computer-readable medium may store computer executable instructions that if executed by a machine (e.g., processor) cause the machine to perform a method that may include one or more of the actions of method 300. While executable instructions associated with the above method are described as being stored on a computer-readable medium, it is to be appreciated that executable instructions associated with other example methods described herein may also be stored on a computer-readable medium.

In one example, data structures may be constructed that facilitate storing data on a computer-readable medium and/or in a data store. Thus, in one example, a computer-readable medium may store a data structure that includes, a first field for data associated with a product tag data (PTD), and a second field for data associated with a personal data (PD). With this "raw" data available, the data structure may also include a third field for data associated with customized redeemable virtual coupon (CRVC), and a fourth field for data associated with a product information (PI) data that are derived from data located in one or more of the first and second fields. While four fields are described, it is to be appreciated that a greater and/or lesser number of fields could be employed.

Figure 4:
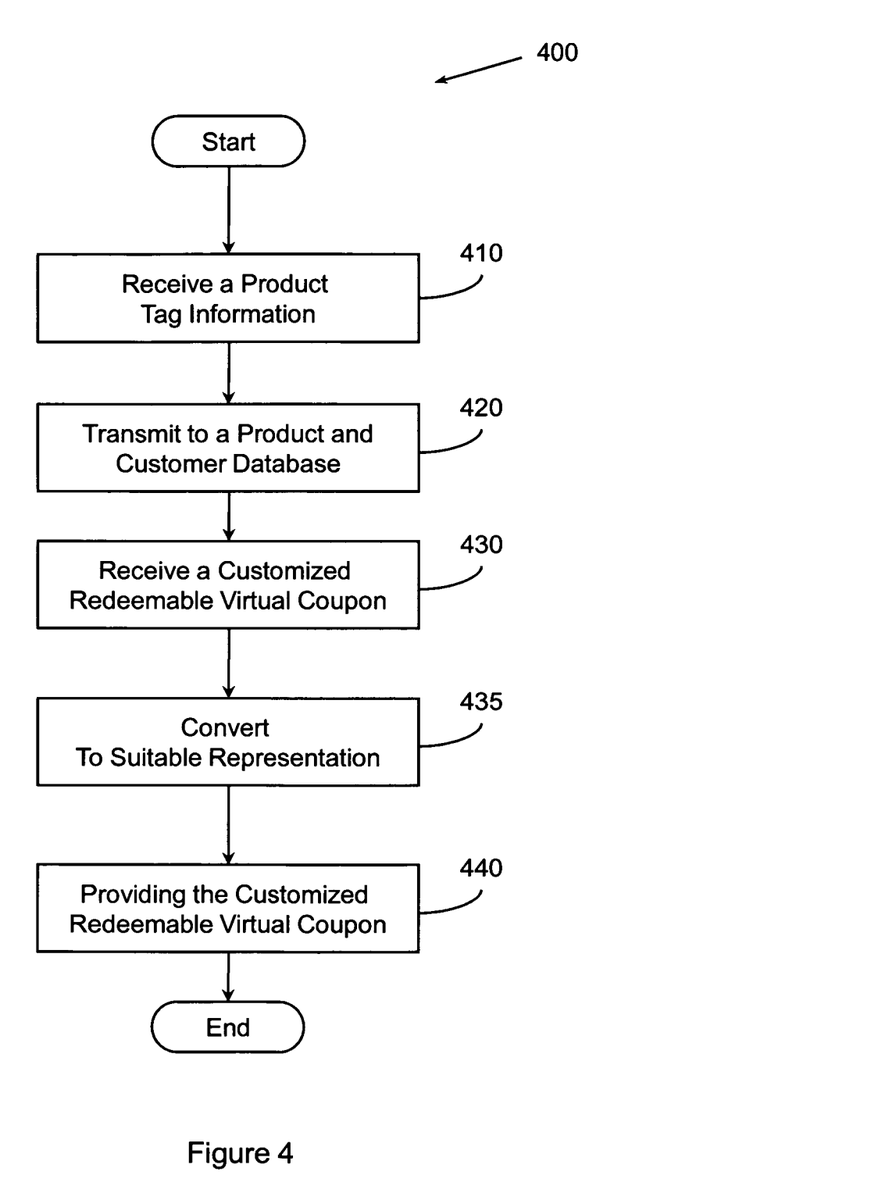
FIG. 4 illustrates another embodiment of a method associated with virtual redeemable offers.

FIG. 4 illustrates a method 400 associated with in store consumer behavior. Method 400 may include, at 410, receiving a product tag information. The product tag information may be associated with a product tag scanned by a PDD.

Method 400 may also include, at 420, transmitting to a product and customer database (PaCD). The transmitting may transmit a personal data and a product tag data (PTD) associated with the product tag information.

Method 400 may also include, at 430, receiving a customized redeemable virtual coupon (CRVC). The CRVC may be based, at least in part, on the PTD, the personal data, and a product information (PI) stored in the PaCD. The PI may be associated with the product tag and describes the product. In another embodiment, the CRVC may also be based, at least in part, on a PTD associated with a past scan(s) of a product tag that is stored in the database. This may allow a database to analyze multiple product tags scanned by the PDD to determine the preferences and desires of a customer. These determinations may allow the database to selectively target the customer with CRVCs related to the personal preferences of the customer. This saves the customer time. In contrast, traditional newspaper coupons require searching though pages of newspaper.

Method 400 may also include, at 435, converting at least a portion of the CRVC to a representation suitable for provision to a POS. For example, a portion of the CRVC may be converted into a scannable image (e.g., barcode) that can be presented to a scanner. The scanner may be part of the POS.

Method 400 may also include, at 440, providing the CRVC. The providing of the CRVC at 440 may be to a POS system during a store checkout. In another embodiment, providing the CRVC at 440 to the POS system is performed by displaying a barcode associated with the CRVC on a display of the PDD. The barcode may be readable by a barcode reader of the POS system. In another embodiment the product tag is located at a first store, and the CRVC is redeemable at a second store.

Figure 5:
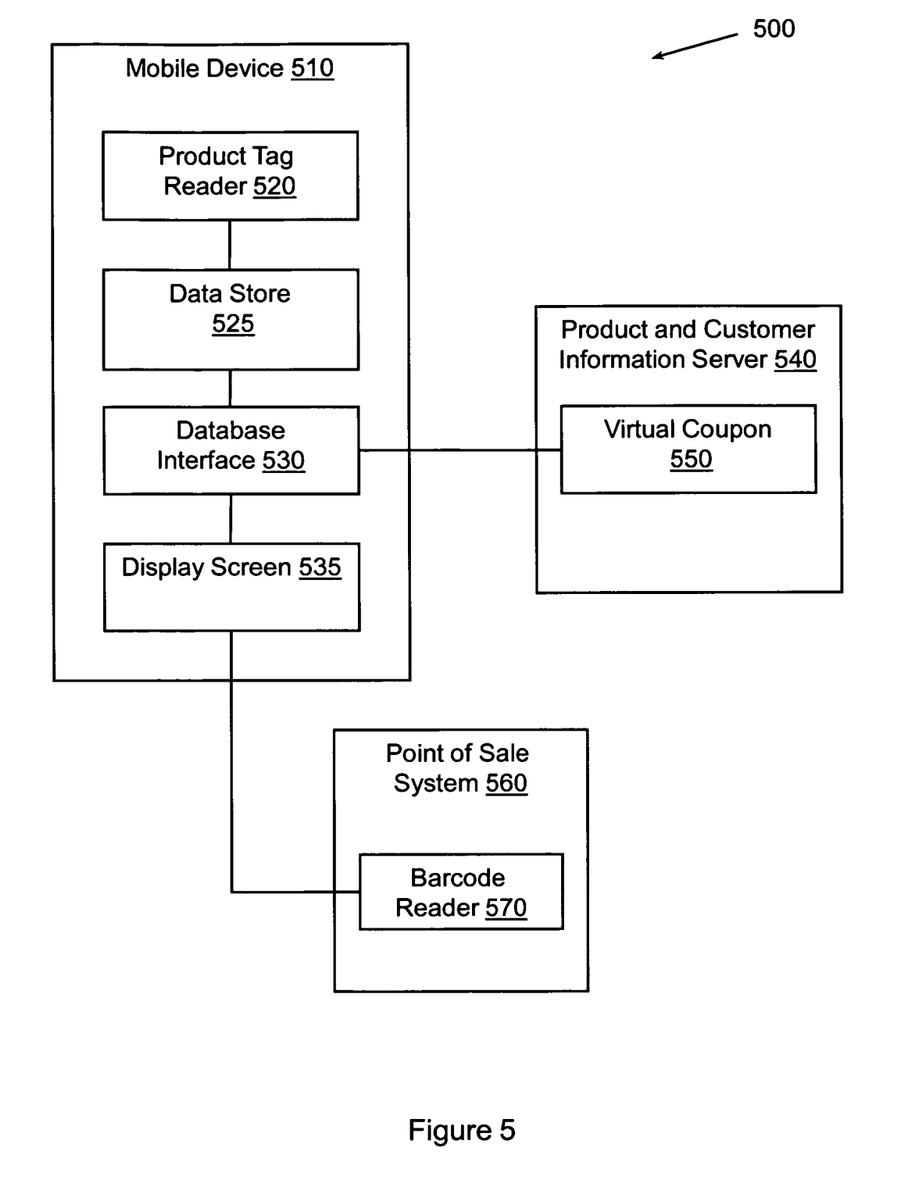
FIG. 5 illustrates one embodiment of a system associated with virtual redeemable offers.

FIG. 5 illustrates a system 500 associated with in store consumer behavior. System 500 includes a mobile device 510. In one embodiment, the mobile device 510 is a mobile phone. Mobile device 510 may include a product tag reader 520 to read a product tag of a product and retrieve a product identifier associated with the product. Mobile device 510 may also include a data store 525 to store a customer information and the product identifier. Mobile device 510 may also include a database interface 530 to interface with a server. Mobile device 510 also includes a display screen 535 to display a barcode.

System 500 also includes a product and customer information server (PaCIS) 540. The PaCIS 540 may receive the customer information and the product identifier from the database interface 530. The PaCIS 540 may receive the customer information and product identifier via a computer communication or an operable connection. The PaCIS 540 provides to the database interface 530 a virtual coupon 550. The virtual coupon 550 is based, at least in part, on the customer information, and a product information associated with the product identifier. The virtual coupon 550 may include information to create the barcode. One skilled in the art will appreciate that the barcode is not the virtual coupon or VRO, but rather is a representation of an offer. The representation may be created by a lossy conversion that produces a representation that can be read by a legacy point of sale device. In one embodiment, the VRO may be directly provided to the point of sale device without conversion. In another embodiment, the virtual coupon 550 is also based on a product information associated with a past product identifier. The past product identifier may be associated with a product tag that was previously read and was stored by the PaCIS 540.

System 500 also includes a point of sale (POS) system 560 including a barcode scanner 570 to read the barcode associated with the virtual coupon 550 displayed on the display screen. In another embodiment, the POS system 560 provides information associated with the barcode read by the barcode reader 570 to the PaCIS 540. While a barcode reader 570 is described, more generally a device that understands the representation produced by the conversion of the VRO is employed. Thus, representations other than a barcode may be employed. Recall that the representation is not the VRO and that the VRO may include additional information including, for example, marketing collateral, video concerning product use, safety warnings, and so on.

Figure 6:
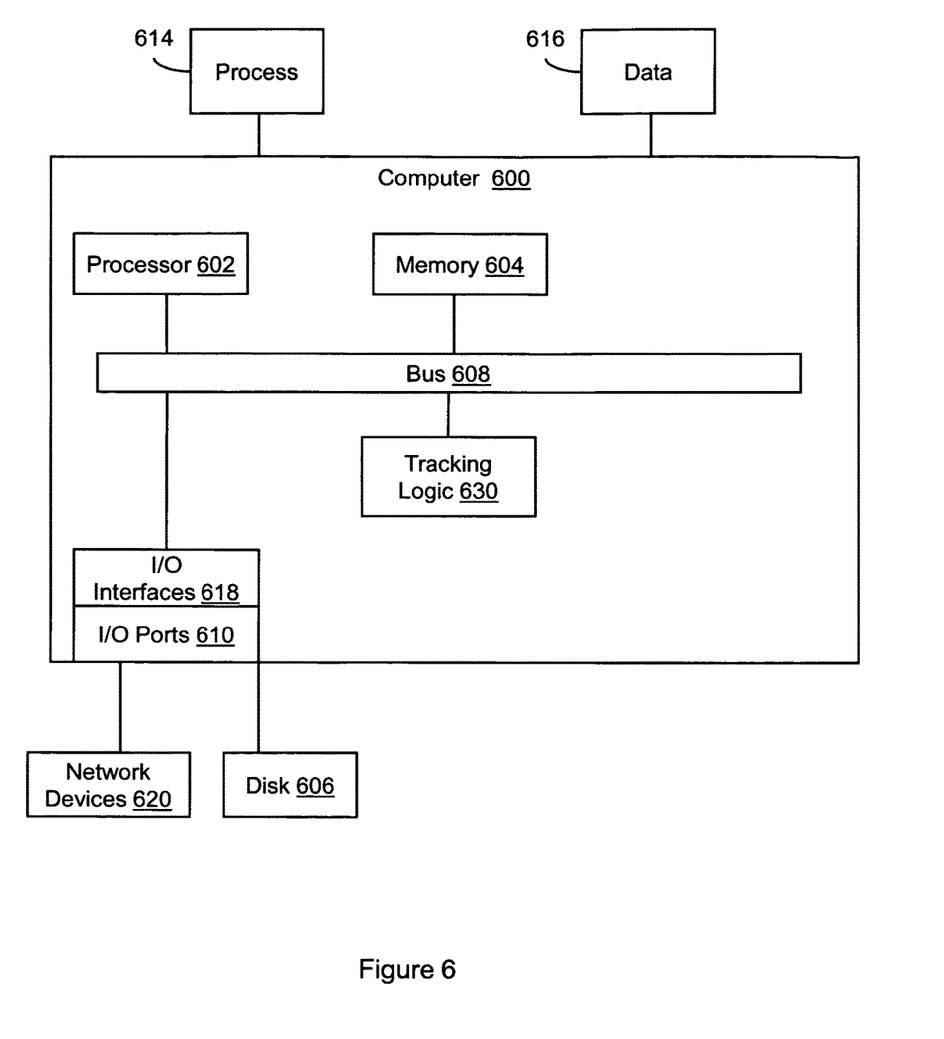
FIG. 6 illustrates one embodiment of computing environment in which various embodiments of the systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a tracking logic 630 configured to facilitate tracking of customer product viewing in a store. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for storing a personal information of a user of the system. The means may be implemented, for example, as an ASIC programmed to store a personal information of a user of the system. The means may also be implemented as computer executable instructions that are presented to computer 600 as data 616 that are temporarily stored in memory 604 and then executed by processor 602.

Logic 630 may also provide means (e.g., hardware, software, firmware) for acquiring a product tag information (PTI) associated with a product tag of a product. Logic 630 may also provide means (e.g., hardware, software, firmware) for creating a customized redeemable virtual coupon (CRVC) that is based, at least in part, on the PTI, the personal information, and a product information. The product information is associated with the product tag and describes the product. Logic 630 may also provide means (e.g., hardware, software, firmware) for providing the CRVC to a point of sale (POS) system during a store checkout. In one example, providing the CRVC to the POS may include creating a representation (e.g., barcode) associated with the CRVC while in another example the CRVC may be provided directly. In one example the logic 630 may include intelligence for determining whether a conversion to a viewable representation is to be performed or whether a direct provision is to be performed.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. An apparatus, comprising:
   a data store to store personal information of a user of the apparatus;
   a tag scanner to read a plurality of times a same product tag is used to acquire product tag information;
   a privacy logic to provide control of selectively sending the personal information to a database;
   a database interface logic:
      to send the personal information in accordance with the control provided by the privacy logic to the database, and to send the product tag information regarding the same product tag acquired by the tag scanner to the database the plurality of times;
      to receive a virtual redeemable offer from the database after having sent the personal information and the product tag information regarding the same product tag to the database the plurality of times without the user having purchased a product associated with the same product tag, where the virtual redeemable offer is based on the product tag information acquired by the tag scanner and based on the same product tag having been scanned multiple times without the user having purchased the product; and
      to transfer the virtual redeemable offer to a second apparatus for a user of the second apparatus to redeem the virtual redeemable offer, the user of the second apparatus redeeming the virtual redeemable offer instead of the user of the apparatus redeeming the virtual redeemable offer; and
   a display to display a barcode that is scannable by a barcode scanner associated with a point of sale system, the barcode being associated with the virtual redeemable offer.

2. The apparatus of claim 1, where the product tag is located at a first store, and where the virtual redeemable offer is redeemable at a second store.

3. The apparatus of claim 1, where the tag scanner is operable to read one or more of, a radio frequency identification product tag, and a near field communication product tag.

4. The apparatus of claim 1, where the personal information includes one or more of, a customer identification number, a customer name, an apparatus identification number, and a product scan data.

5. A method, performable by a first portable digital device of a user, comprising:
   scanning a same product tag a plurality of times to obtain product tag information associated with the product tag;
   transmitting to a product and customer database personal data and product tag data from the scanned product tag information regarding the same product tag the plurality of times;
   receiving a redeemable virtual offer that is based on the product tag data, the personal data, and product information stored in the product and customer database, and that is based on the same product tag having been scanned multiple times without the user having purchased a product associated with the same product tag, after having sent the personal data and the product tag data regarding the same product tag the plurality of times;
   creating a representation of the redeemable virtual offer; and
   transferring the representation of the redeemable virtual offer to a second portable digital device, a user of the second portable digital device to provide the representation of the redeemable virtual offer to a point of sale system during a store checkout instead of a user of the first portable digital device redeeming the virtual redeemable offer.

6. The method of claim 5, where the redeemable virtual offer is also based, at least in part, on a product tag data associated with one or more past scans of a product tag that is stored in the database.

7. The method of claim 5, where providing the redeemable virtual offer to the point of sale system is performed by displaying a barcode associated with the redeemable virtual offer on a display of the second portable digital device, and where the barcode is readable by a barcode reader of the point of sale system.

8. The method of claim 5, where the product tag is located at a first store, and where the redeemable virtual offer is redeemable at a second store.

9. The method of claim 5, including the following performed by a server:
receiving the product tag data and the personal data from the first portable digital device;
storing the product tag data and the personal data in the product and customer database;
creating the redeemable virtual offer based, at least in part, on an analysis of the personal data, the product tag data, and product information associated with the product tag, where the product information is stored in the product and customer database and describes the product; and
providing the redeemable virtual offer to the portable digital device.

10. The method of claim 9, including receiving from the point of sale system information associated with the redeemable virtual offer that was scanned and redeemed at the point of sale system, and where the product and customer database stores the information associated with the redeemable virtual offer in the database.

11. The method of claim 9, where receiving the product tag data from the portable digital device includes receiving a product tag from a mobile phone that performs the scan by using a radio frequency identification (RFID) scanner, and where the method includes determining a customer preference based on analyzing of one or more of, the personal data, the product tag data, and the product information.

12. A system, comprising:
a first mobile device of a user including:
a product tag reader to scan a same product tag of a product a plurality of times and to retrieve, based on the read product tag, a product identifier associated with the product the plurality of times;
a data store to store customer information and the product identifier;
a database interface to send the customer information and the product identifier to a server the plurality of times; and
a display screen to display a barcode;
a product and customer information server:
to receive the customer information and the product identifier regarding the same product tag from the database interface the plurality of times;
to provide, after receiving the customer information and the product identifier the plurality of times, to the database interface a virtual coupon based on the customer information, and a product information associated with the product identifier, and based on the same product tag having been scanned multiple times without the user having purchased a product associated with the same product tag and where the virtual coupon includes information to create the barcode; and
a point of sale system comprising a barcode scanner to read the barcode associated with the virtual coupon displayed on the display screen,
wherein the first mobile device is to transfer the virtual coupon to a second mobile device, a user of which to redeem the coupon at the point of sale system in lieu of a user of the first mobile device.

13. The system of claim 12, the product and customer information server comprising:
a receive logic to receive a product tag information and a customer information from the first mobile device, where the product tag information is associated with a scan of a product tag;
a product and customer database:
to store the product tag information and the customer information; and
to create a customized marketing information based, at least in part, on the product tag information and the customer information, where the customized marketing information includes a product information associated with the product tag information and retrieved from the product and customer database; and
a transmit logic to transmit the customized marketing information to the first mobile device, where the customized marketing information that is transmitted to the first mobile device includes a virtual redeemable offer that is storable on the first mobile device, and where the virtual redeemable offer is redeemable at the point of sale system.

14. The apparatus of claim 1, wherein the data store is to store a plurality of past scans of product tags by the tag scanner, the personal information stored that is sent to the database in accordance with the control provided by the privacy logic comprising the past scans.

15. The apparatus of claim 1, wherein transfer of the virtual redeemable offer to the second apparatus results in the virtual redeemable offer no longer being redeemable by the user of the apparatus.

* * * * *